United States Patent
Gao et al.

(10) Patent No.: US 10,082,019 B2
(45) Date of Patent: Sep. 25, 2018

(54) METHODS AND SYSTEMS TO BOOST SURFACE DETECTED ELECTROMAGNETIC TELEMETRY SIGNAL STRENGTH

(71) Applicant: Schlumberger Technology Corporation, Sugar Land, TX (US)

(72) Inventors: Guozhong Gao, Katy, TX (US); Luis Eduardo DePavia, Sugar Land, TX (US); Gaelle Jannin, Katy, TX (US)

(*) Notice: Subject to any disclaimer, the term of this patent is extended or adjusted under 35 U.S.C. 154(b) by 0 days.

(21) Appl. No.: 15/536,517

(22) PCT Filed: Dec. 17, 2015

(86) PCT No.: PCT/US2015/066389
§ 371 (c)(1),
(2) Date: Jun. 15, 2017

(87) PCT Pub. No.: WO2016/100672
PCT Pub. Date: Jun. 23, 2016

(65) Prior Publication Data
US 2017/0362932 A1    Dec. 21, 2017

Related U.S. Application Data

(60) Provisional application No. 62/093,925, filed on Dec. 18, 2014.

(51) Int. Cl.
*E21B 4/12* (2006.01)
*E21B 47/12* (2012.01)
(Continued)

(52) U.S. Cl.
CPC .......... *E21B 47/122* (2013.01); *G08C 17/02* (2013.01); *H04Q 9/14* (2013.01)

(58) Field of Classification Search
CPC .......... E21B 47/122; G08C 17/02; H04Q 9/14
See application file for complete search history.

(56) References Cited

U.S. PATENT DOCUMENTS 5,883,516 A    3/1999  Van Steenwyk et al.
7,145,473 B2  12/2006  Wisler et al.
(Continued)

OTHER PUBLICATIONS

International Search Report and Written Opinion issued in International Application PCT/US2015/066389 dated Mar. 2, 2016. 16 pages.
(Continued)

*Primary Examiner* — Leon Flores (57) ABSTRACT

A method for signal communication between a well drilling instrument and the Earths surface includes generating an electromagnetic field in an instrument disposed in drill string used to drill a wellbore. The electromagnetic field includes encoded measurements from at least one sensor associated with the instrument. A signal corresponding to an amplitude and/or phase of the electromagnetic field is measured between the drill string and a surface electrode when the drill string is substantially electrically isolated from a well casing. A signal corresponding to the amplitude and/or phase is measured between the casing and a surface electrode when the casing and the drill string are in electrical contact with each other.

19 Claims, 8 Drawing Sheets

(51) Int. Cl.
  *G08C 17/02*  (2006.01)
  *H04Q 9/14*  (2006.01)

(56) References Cited

U.S. PATENT DOCUMENTS

| | | |
|---|---|---|
| 2005/0046587 A1 | 3/2005 | Wisler et al. |
| 2005/0167098 A1 | 8/2005 | Lovell et al. |
| 2011/0168446 A1 | 7/2011 | Lemenager et al. |
| 2013/0342354 A1 | 12/2013 | Petrovic et al. |
| 2016/0003034 A1* | 1/2016 | Liu .................. E21B 47/122 340/853.2 |
| 2016/0201455 A1* | 7/2016 | Liu .................. H04W 52/0245 340/854.6 |

OTHER PUBLICATIONS

Spinnler et al., Mud Pulse Logging while drilling telemetry system design, development, and demonstrations. Presented at IADC conference Mar. 7-9, 1978. Houston, TX.

Soulier et al., EM MWD data transmission status and perspectives. SPE/IADC 25686 presented at SPE/IADC Drilling Confrerence Feb. 23-25, 1993. Amsterdam.

* cited by examiner

METHODS AND SYSTEMS TO BOOST SURFACE DETECTED ELECTROMAGNETIC TELEMETRY SIGNAL STRENGTH

CROSS-REFERENCE TO RELATED APPLICATIONS

The present application claims the benefit of, and priority to, U.S. Provisional Patent Application No. 62/093,925, filed Dec. 18, 2014, which is hereby incorporated by reference in its entirety.

STATEMENT REGARDING FEDERALLY SPONSORED RESEARCH OR DEVELOPMENT

Not applicable.

BACKGROUND

This disclosure is related to the field of measurement while drilling ("MWD") and logging while drilling ("LWD"). More particularly, the disclosure relates to improved electromagnetic telemetry techniques for communicating data between MWD and/or LWD instruments and the Earth's surface.

U.S. Patent Application Publication No. 2011/0168446A1 and U.S. Pat. No. 7,145,473 B2 describe examples of electromagnetic telemetry for communicating signals between equipment disposed at the Earth's surface and LWD and/or MWD instruments in a wellbore. One type of electromagnetic telemetry known in the art includes an electric dipole antenna formed by an insulated gap between conductive segments on a drill collar associated with the MWD and/or LWD instruments, or by a toroid disposed on the outer surface of the collar. A time varying voltage impressed across the insulated gap (or the toroid) generates an electromagnetic field which can be used to communicate between a surface electric dipole receiver antenna or a plurality of differently oriented electric dipole antennas and the MWD/LWD instrument. See the basic concept shown in FIG. 1. A surface transceiving sensor, i.e., a dipole antenna, may be composed of an electrode placed in the ground a selected distance from a drilling unit or "rig" and the well casing. The voltage between the electrode and the well casing is measured and signals from the MWD and/or LWD instruments encoded into the transmitted electromagnetic field are decoded from the measured voltages. Conversely, voltage imparted across the casing and electrode may induce an electromagnetic field in the subsurface that is detectable by the dipole antenna or toroid on the MWD/LWD instrument and internally decoded. The foregoing signal communication from wellbore to surface may be referred to as "uplink" communication and the surface to wellbore communication may be referred to as "downlink" communication.

Figure 1:
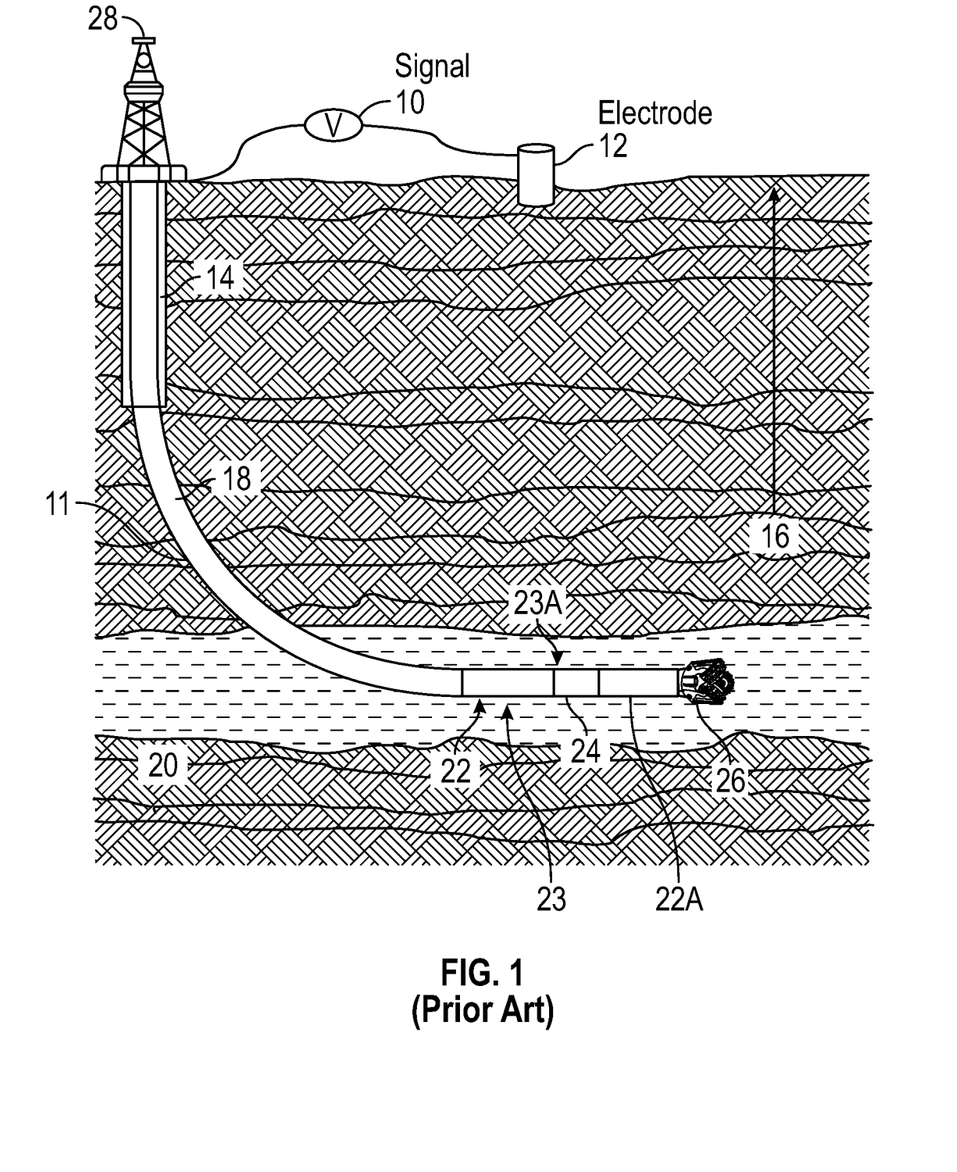
FIG. 1 shows an electromagnetic telemetry system known in the art prior to the present disclosure.

Referring to FIG. 1, an electromagnetic telemetry system known in the art is shown to explain the basic components thereof. U.S. Patent Application Publication No. 2011/0168446A1 and U.S. Pat. No. 7,145,473B2 referred to above describe adaptations of the system shown in FIG. 1 and may be referred to for more details. A drilling unit or "rig" is shown generally at 28 and has equipment (not shown separately) to raise, lower and rotate a drill string 18 with a bottom hole assembly (BHA) 23 at its lower end. A drill bit 26 is disposed at the longitudinal end of the BHA 23 and is rotated, either by the drilling unit 28 and/or a motor (not shown) in the drill string 18 to axially extend the length of a wellbore 11. When the wellbore 11 is initialed drilled to a selected depth, a casing 14 may be inserted into the wellbore 11 and cemented in place. Drilling may then resume. The BHA 23 may include an MWD and/or LWD instrument, shown generally at 23A. The MWD/LWD instrument may be any type known in the art and may include sensors (not show separately) for measuring orientation of the BHA 23, as well as sensors for measuring shock and vibration of the BHA 23, and/or sensors for measuring one or more physical parameters of the formations (including conductive layers 16 and a reservoir formation 20) through which the instrument 23A passes during drilling and any subsequent movement within or along the wellbore 11. Such physical parameters may be of any kind known in the art, and may include, without limitation, electrical resistivity, acoustic velocity, natural gamma radiation, spectrally analyzed natural gamma radiation, density, neutron porosity and/or capture cross section, and nuclear magnetic resonance relaxation times. The foregoing are only examples and in no way are intended to limit the scope of the present disclosure.

In the present example circuitry (not shown) in the instrument 23A may be used to impart a time varying voltage across an insulating gap 24 disposed between conductive components 22, 22A of the instrument 23A. The circuitry (not shown) in the instrument 23A may include devices to encode measurements from the various sensors (not shown) in the instrument into the time varying voltage. The imparted voltage generates a time varying electromagnetic field in the formations 20, 16 which includes the encoded measurement data. In the present example, a voltage induced between an electrode 12 inserted into the ground at a selected distance from the drilling rig 28 and the casing 14 may be measured and decoded into data encoded into the time varying voltage by a surface measurement and decoding system, shown generally at 10 and which may be of any type known in the art.

However, the amplitude of the electromagnetic field induced by the instrument 23A is highly attenuated before it reaches the surface. Research has found that limiting factors for the received signal amplitude include the subsurface formation resistivity distribution, drilling fluid electrical resistivity and the depth of the MWD/LWD instrument in the wellbore. All of the foregoing may cause substantial transmitted signal attenuation such that reliable data communication may be difficult to obtain. Electromagnetic telemetry is preferred over drilling fluid flow modulation ("mud pulse") telemetry not only because it works in certain conditions where mud pulse telemetry does not, e.g., underbalanced drilling or when the gas or air is used as the drilling fluid, but more importantly, higher data communication rate can be achieved if the signal attenuation can be adequately reduced.

Figure 2A:
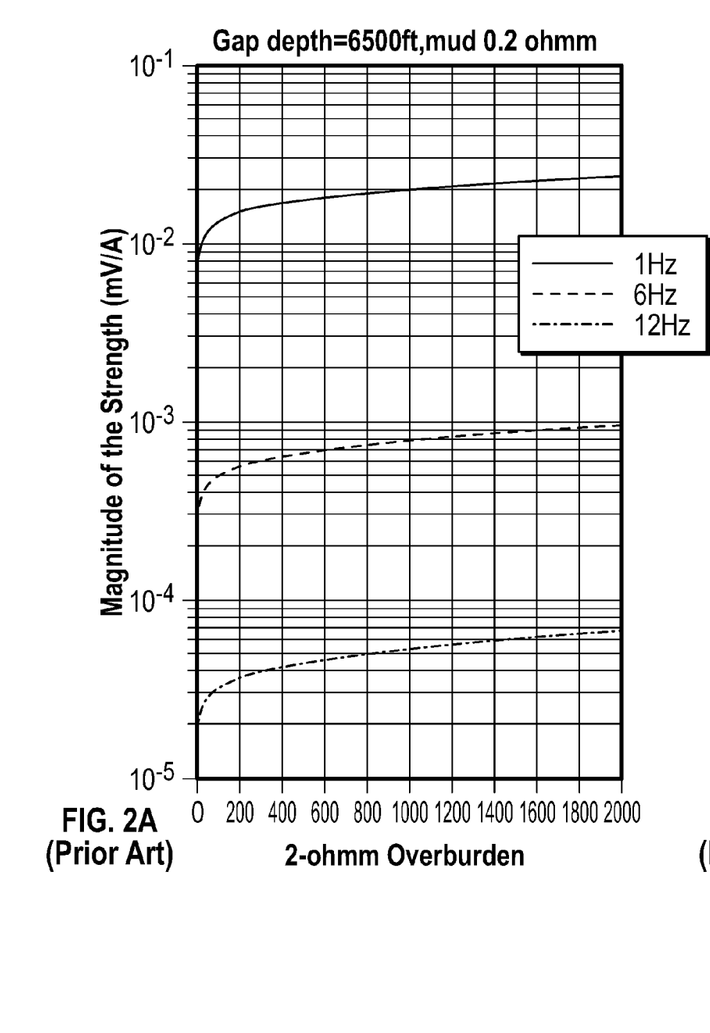
FIGS. 2A and 2B show, respectively, attenuation of transmitted telemetry signal at various frequencies by overburden formation at a telemetry transmitter depth of 6,500 feet for overburden resistivity of 2 ohm-m and 8 ohm-m using the telemetry as shown in FIG. 1.
Figure 2B:
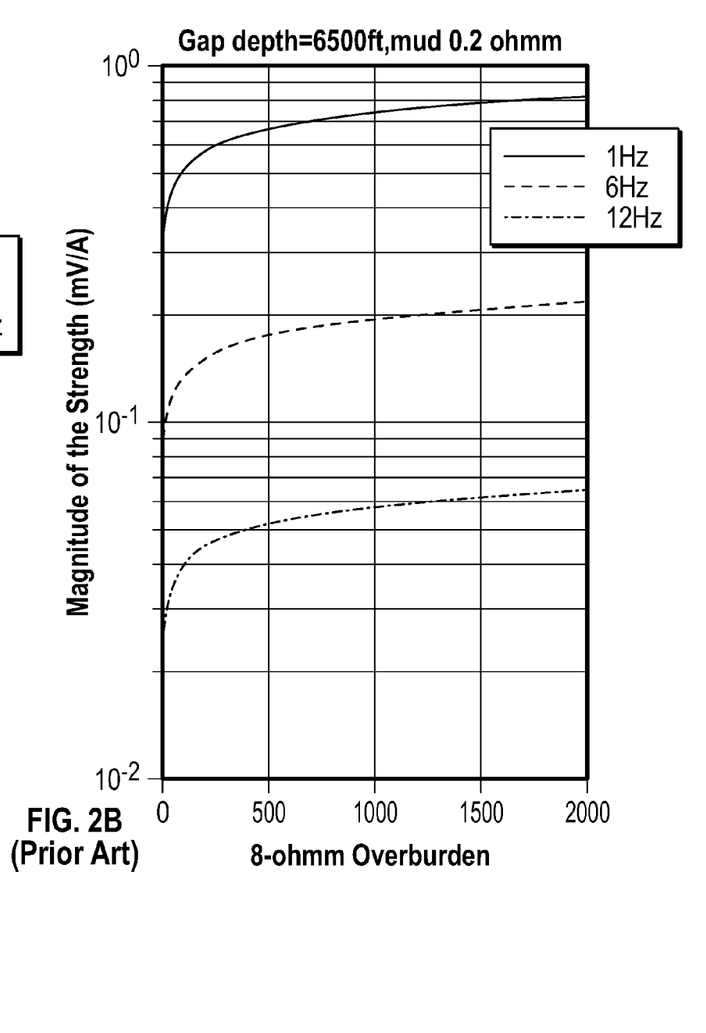

FIGS. 2A and 2B show examples of how conductive formations overlying the instrument (23A in FIG. 1), called "overburden", attenuate the amplitude of the voltage detectable at the surface. The attenuation is sensitive to the frequency of the time varying voltage imparted across the insulating gap (24 in FIG. 1) and thus, depending on certain conditions may limit the available rate at which data may be communicated between the surface and the instrument (23A in FIG. 1). Conductive drilling fluid in the wellbore and conductive formations are two of the most significant barriers to high data rate signal communication. FIG. 2A shows the case where the formations overlying the wellbore in which the MW/LWD tool have a resistivity of about 2 ohm-m, and FIG. 2B shows the case for overlying formations having resistivity of about 8 ohm-m.

SUMMARY

One aspect of the disclosure relates to a method for signal communication between a well drilling instrument and the Earth's surface. Embodiments of a method according to this aspect may include generating an electromagnetic field in an instrument disposed in drill string used to drill a wellbore. The electromagnetic field may include encoded measurements from at least one sensor associated with the instrument. A signal corresponding to an amplitude and/or phase of the electromagnetic field is measured and the sensor measurements are decoded from the measured signal. The measured signal may include one of a voltage imparted across the drill string and an electrode disposed at a selected distance from the wellbore proximate the surface when the drill string and a wellbore casing are substantially electrically isolated from each other; a current induced in the drill string when the drill string and the wellbore casing are substantially electrically isolated from each other, and a voltage imparted across the well casing and the electrode when the casing and the drill string are electrically connected to each other.

Another aspect of the disclosure relates to a system for communication between a wellbore instrument and the Earth's surface. A system according to the present aspect may include an electromagnetic signal generator associated with the wellbore instrument. The electromagnetic signal generator is configured to encode measurements made by at least one sensor associated with the wellbore instrument. The system may also include an electromagnetic field detector in signal communication with the electromagnetic signal transmitter and disposed proximate the Earth's surface. The electromagnetic field detector may include one of a voltage measuring circuit connected between the drill string and an electrode disposed at a selected distance from the wellbore proximate the Earth's surface when the drill string and a wellbore casing are substantially electrically isolated from each other, a current measuring circuit for measuring current induced in the drill string when the drill string and the wellbore casing are substantially electrically isolated from each other, and a voltage measuring circuit connected between the well casing and the electrode wherein the casing and the drill string are electrically connected to each other.

Other aspects and possible advantages of systems and methods according to the present disclosure will be apparent from the description and claims that follow.

DETAILED DESCRIPTION

One aspect of the present disclosure relates to methods and systems which may substantially expand the applicability of electromagnetic (EM) telemetry for communication of sensor measurements made by wellbore drilling instruments to the Earth's surface. Methods and systems according to the present disclosure may substantially boost the surface-detectable signal strength of EM telemetry used in measurement while drilling (MWD) and logging while drilling (LWD) measurement apparatus. Two example methods and systems will be described in more detail below.

A first example system and method may include three components: i) a drill string (or drill pipe) disposed in a wellbore, wherein the drill string includes an electromagnetic (EM) signal transmitter proximate a bottom end thereof; ii) an electrically conductive, e.g., metallic casing disposed in at least part of the wellbore from a surface end of the wellbore to a selected depth therein; and iii) resistive drilling fluid ("mud") in the wellbore. Both the drill string and the casing may be made of electrically conductive metal, for example steel. The drilling mud may be resistive, for example, at least 1,000 ohm-m resistivity and at most 1,000,000 ohm-m resistivity. The foregoing mud resistivity range and having electrically conductive metal casing/drill string may be used when the drill string and the casing are electrically connected to each other during wellbore drilling operations. In the present example embodiment one or more electrical contact points between the casing and the drill string may be disposed close to the surface end of the casing, and the contact resistivity at such contact points may be at most about 10 ohm-m. When the foregoing conditions are met, the overall EM telemetry signal strength detectable at the Earth's surface may be substantially increased and EM telemetry signal attenuation due to vertical depth of the wellbore in electrically conductive subsurface formations may be minimized irrespective of wellbore vertical depth as contrasted with the detection systems explained with reference to FIG. 1. The foregoing conditions may be made possible by the fact that the subsurface formations disposed between the electromagnetic signal transmitter on the MWD/LWD instruments (see FIGS. 3, 3A and 3B) and the surface detector system (FIG. 4) are substantially bypassed electrically. If the drilling mud has a resistivity within the above example range, almost no EM telemetry signal attenuation will be observed during operation of the MWD/LWD instruments in the wellbore.

A second example method and system may include an EM signal transmitter in a drill string as in the previous embodiment and a well casing as in the previous embodiment. In the present embodiment the drill string and casing may be electrically insulated or isolated from each other, or otherwise imperfectly connected as much as may be practical. A surface electrode may be disposed in the ground surface at a selected distance from the well casing surface position. A voltage imparted between the drill string and the electrode may be measured, or a current induced in the drill string may be measured. The EM telemetry signal may also be measured by measuring a voltage induced between the drill string and the casing. Using such configurations, the measured EM telemetry signal may be as much as 1,000 times (60 dB) larger than EM telemetry signals measured using measurement apparatus and methods such as explained with reference to FIG. 1. Using the present example embodiment of a measurement method and apparatus, the measured EM telemetry signal amplitude may be substantially independent of vertical depth of the EM telemetry transmitter in the subsurface. Another possible advantage of a system and method according to the present example embodiment is that the EM telemetry signal measured when the electromagnetic signal transmitter is disposed in the casing may be substantially unattenuated.

Figure 3:
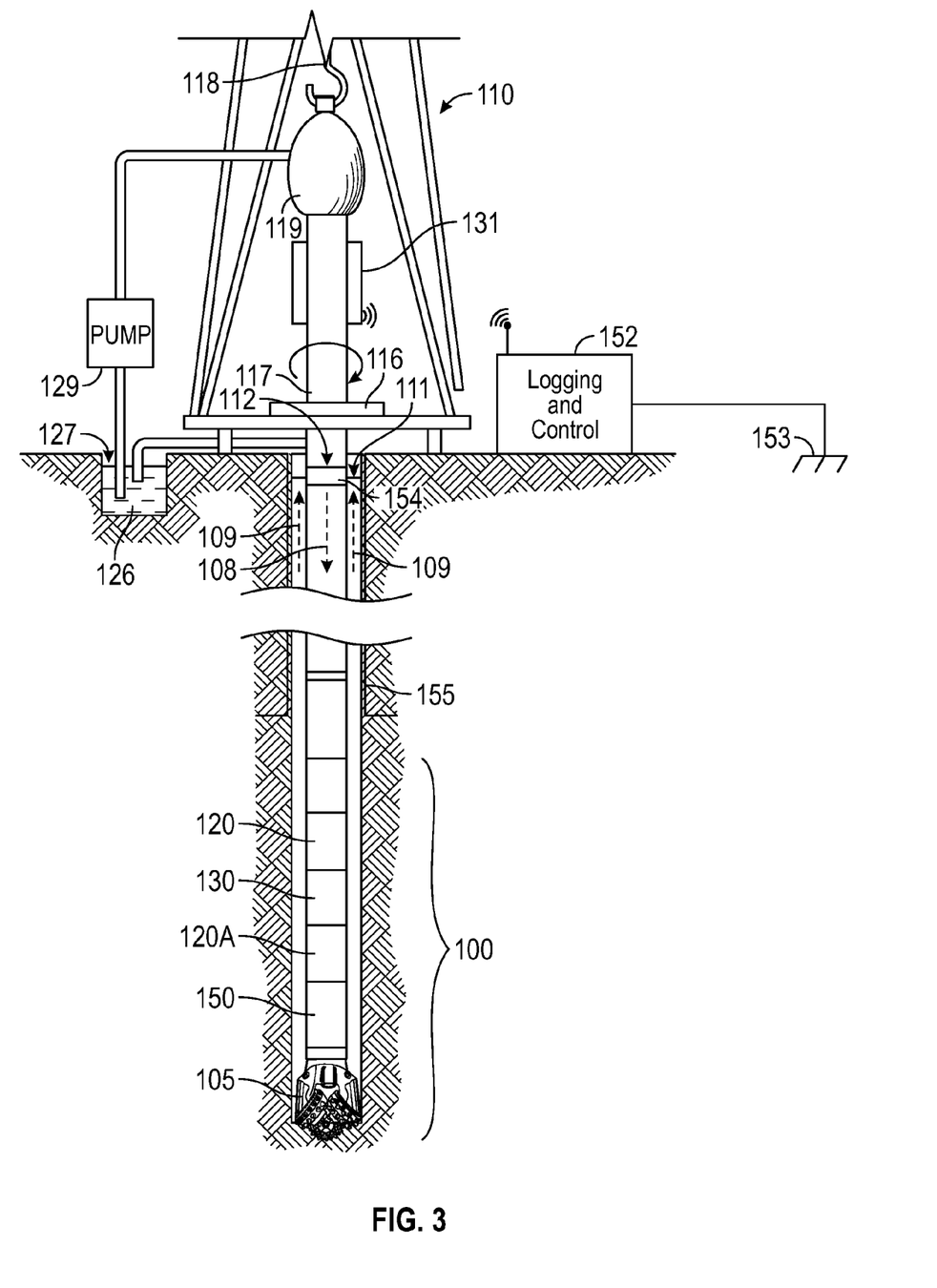
FIG. 3 shows one example of drilling, measurement and telemetry system of some embodiments.

FIG. 3 shows an example embodiment of a drilling and measurement system that may be used in various embodiments according to the present disclosure. The system shown in FIG. 3 may be deployed in either onshore or offshore applications. In a system as shown in FIG. 3, a wellbore 111 is formed in subsurface formations by rotary drilling in a manner that is well known to those skilled in the art. Although the wellbore 111 in FIG. 3 is shown as being drilled substantially straight and vertically, the wellbore 111 may be directionally drilled, including having a substantially horizontal section, with equal effect as a substantially vertical wellbore.

A drill string 112 is suspended within the wellbore 111 and may have a bottom hole assembly (BHA) 100 which includes a drill bit 105 at its lower end. The surface part of the system includes a platform and derrick assembly 110 positioned over the wellbore 111, with the platform and derrick assembly 110 including a rotary table 116, a kelly 117, a hook 118 and a rotary swivel 119. In a drilling operation, the drill string 112 may be rotated by the rotary table 116 (energized by means not shown), which engages the kelly 117 at the upper end of the drill string 112. The kelly 117 is suspended from the hook 118. The hook 118 may be attached to a traveling block (not shown), through the kelly 117 and the rotary swivel 119 which permits rotation of the kelly 117 and thereby the drill string 112 relative to the hook 118. As is well known, a top drive system could be used in other embodiments in substitution for the kelly 117, rotary table 116 and swivel 119.

Drilling fluid or mud 126 may be stored in a pit 127 formed at the well site (or on a drilling platform in marine drilling). A pump 129 moves the drilling mud 126 from the tank or pit 127 to the interior of the drill string 112 via a port in the swivel 119, which causes the drilling fluid 126 to flow downwardly through the drill string 112, as indicated by directional arrow 108. The drilling mud 126 exits the drill string 112 via ports (not shown) in the drill bit 105, and then circulates upwardly through an annular space region between the outside of the drill string 112 and the wall of the wellbore 111, as indicated by directional arrows 109. In this known manner, the drilling mud 126 lubricates and cools the drill bit 105 and carries formation cuttings up to the surface as it is returned (after removal of entrained drill cuttings and other contaminants) to the pit 127 for recirculation.

The BHA 100 is shown as having one MWD module 130 and one or more LWD modules 120 with reference number 120A depicting an electromagnetic signal transmitter. As used herein, the term "module" as applied to the MWD and LWD devices is understood to mean either a single measuring instrument or multiple measuring instruments contained in a single modular device, or multiple modular devices. Additionally, the BHA 100 may include a rotary steerable system (RSS) and motor 150 or a steerable drilling motor.

The LWD module(s) 120 may be housed in a drill collar and can include one or more types of well logging sensors. The LWD module(s) 120 may include capabilities for measuring, processing, and storing information, as well as for communicating with surface equipment. By way of example, the LWD module(s) 120 may include one or more of a nuclear magnetic resonance (NMR) logging tool, a nuclear logging tool, a resistivity logging tool, an acoustic logging tool, or a dielectric logging tool, and so forth, and may include capabilities for measuring, processing, and storing information, and for communicating with the surface equipment (e.g., by suitably operating the electromagnetic signal transmitter 120A).

The MWD module 130 may also be housed in a drill collar, and may contain one or more devices for measuring characteristics of the drill string 112 and drill bit 105. In the present embodiment, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a "D&I package"). The MWD module 130 may further include an apparatus (not shown) for generating electrical power for the MWD module 130 and the LWD module(s) 120. For example, electrical power generated in the MWD module 130 may be used to power the MWD module 130 and the LWD module(s) 120. In the present example embodiment, the electrical power may be generated by a mud flow driven turbine generator (not shown) or may be stored in batteries (not shown) and may be used to operate the measurement devices in the respective modules 120, 130 and the electromagnetic signal transmitter 120A. Any of the LWD module(s) 120 and the MWD module 130 may include circuitry to drive the electromagnetic signal transmitter 120A to generate an encoded electromagnetic signal that includes any or all of the various sensor measurements made by the devices in the respective modules 120, 130. The electromagnetic signal transmitter 120A may be, for example and without limitation an insulating gap disposed between electrodes, wherein a time varying voltage corresponding to the electromagnetic transmitter signal to be generated is imparted across the electrodes. In other embodiments, the electromagnetic transmitter 120A may be a toroidal wire coil through which a time varying electrical current is passed. The amplitude of the time varying current may correspond to the electromagnetic transmitter signal that is to be generated.

Figure 3A:
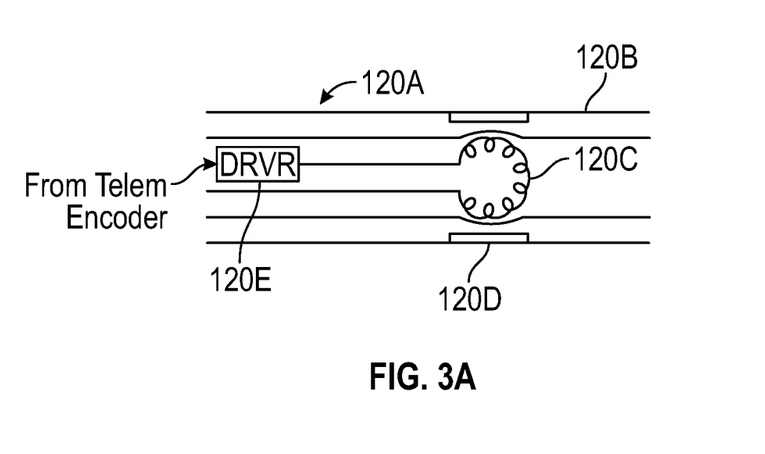
FIG. 3A shows one example embodiment of an electromagnetic signal transmitter.
Figure 3B:
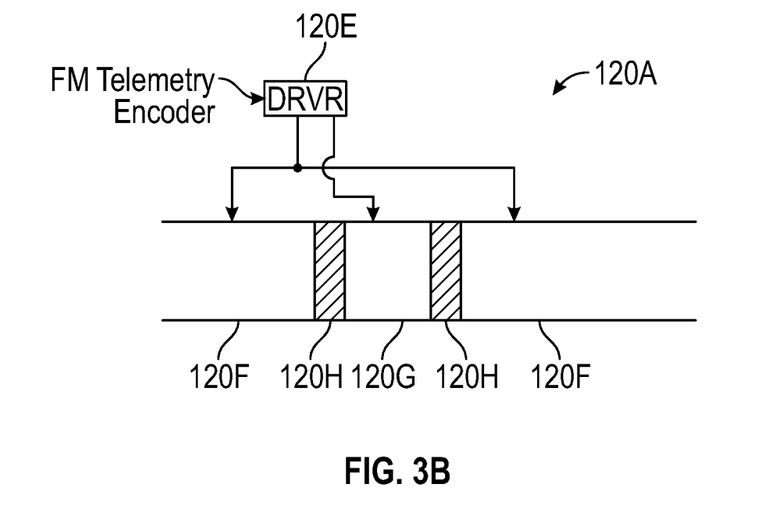
FIG. 3B shows another example embodiment of an electromagnetic signal transmitter.

The foregoing examples of an electromagnetic signal transmitter are shown in FIGS. 3A and 3B, respectively. In FIG. 3A, a transmitter driver 120E may be in signal communication at its input with a telemetry encoder (not shown separately) in either of the MWD module (130 in FIG. 3) or the LWD module (120 in FIG. 3). The transmitter driver 120E output may be coupled to a toroidal coil 120C disposed in a recess on the exterior of a drill collar 120B in which the functional components of the electromagnetic signal transmitter 120A may be disposed. The toroidal coil 120C may be covered on its exterior by a wear resistant shield 120D. FIG. 3B shows another example embodiment of the electromagnetic signal transmitter 120A, in which the transmitter driver 120E has its output electrically connected to first electrodes 120F electrically isolated by insulators 120H from a second electrode 120G. In the present example embodiment, a time varying voltage corresponding to the encoded electromagnetic telemetry signal may be imparted across the first 120F and second 120H electrodes. For both the foregoing embodiments, the time varying current or voltage induces an electromagnetic field in the formations surrounding the electromagnetic signal transmitter 120A, a component of which may be detected as will be further explained with reference to FIGS. 4 and 5.

Returning to FIG. 3, operation of the MWD 130 and LWD 120 modules may be controlled using a surface logging and control system 152 (control system) located at the surface, in some embodiments proximate the wellbore 111. The control system 152 may include one or more processor-based computing systems. In the present context, a processor or processor-based computing system may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and the like. The control system 152 may include circuitry, not shown separately, for detecting a voltage induced between a casing 155 disposed at least part way into the wellbore 111 and a surface electrode 153, between the casing 155 and the drill string 111, and/or between the drill string 111 and the surface electrode 153. The surface electrode 153 may be disposed in the ground surface (or the water bottom in marine drilling operations) at a selected distance from the surface end of the casing 155 depending on the signal being measured and the vertical depth of the wellbore 111. In some embodiments, a current sensor or current clamp 131 may measure current induced in the drill string 112 by operation of the electromagnetic signal transmitter 120A. As explained above, an electromagnetic field is induced in the subsurface formations when the electromagnetic signal transmitter 120A is actuated, and such electromagnetic field induces voltages or current that may be measured as will be further explained herein. The measured voltage or current may have an amplitude and/or phase that is related to the electromagnetic field induced by the electromagnetic signal transmitter 120A.

The drill string 112 may include one or more standoffs or centralizers 154 disposed in or on the drill string 112 in a portion disposed in a casing 155 in the wellbore 111, in some embodiments disposed proximate the surface end of the casing 155. The standoffs or centralizers 154 may have an external diameter larger than an external diameter of the drill string 112 disposed in the casing 155, up to a limit of an internal diameter of the casing 155. Depending on which of the two types of measurements are to be made of induced voltage or induced current, as explained above, the standoffs or centralizers 154 may make electrical contact between the drill string 112 and the casing 155. In such embodiments, the standoffs or centralizers 154 may include electrically conductive brushes, blades, rollers or any similar device that can make an electrical connection between the drill string 112 and the casing 155. If the type of induced voltage measurement requires that the drill string 112 and the casing 155 are substantially electrically isolated from each other, the centralizers or standoffs 154 may be made from or may include an electrically insulating material, e.g., glass fiber reinforced plastic. Such plastic may be covered on an exterior surface thereof with a hard material such as metal (e.g., steel) to resist wear during drill string rotation in the casing 155.

Figure 4:
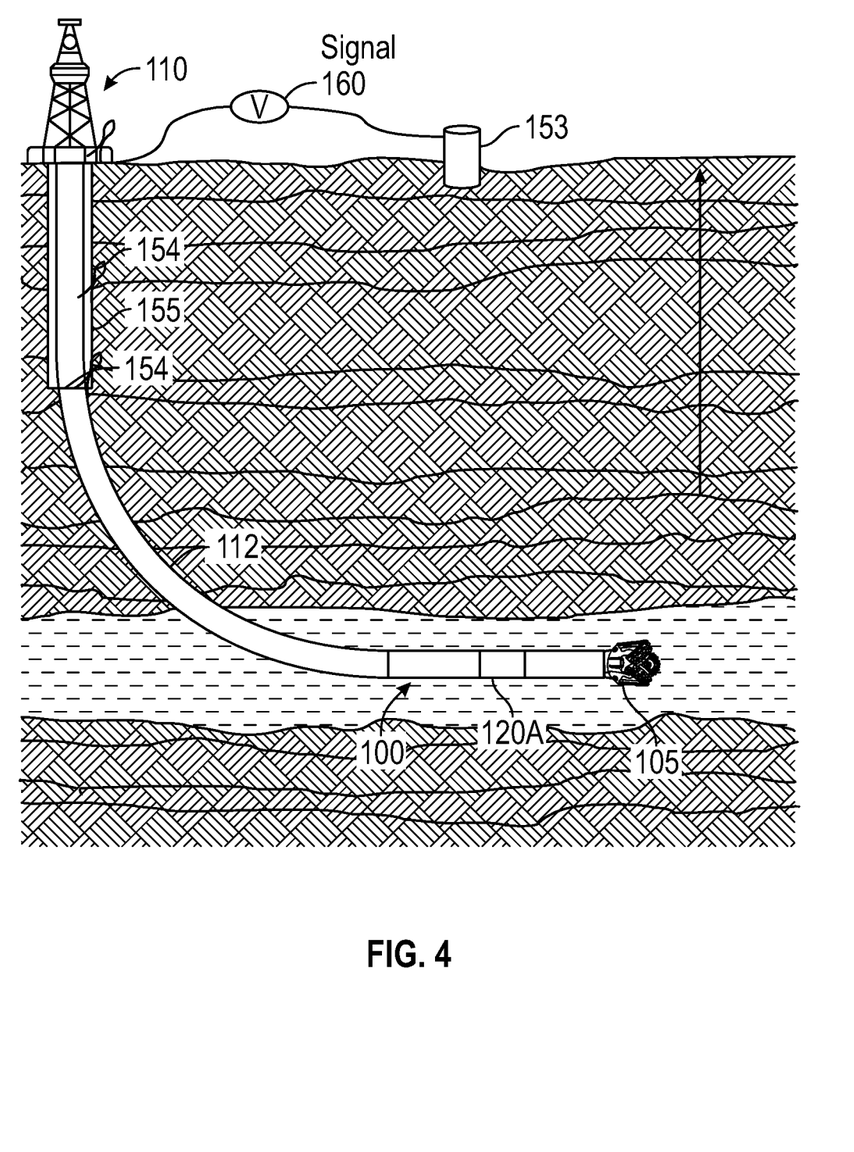
FIG. 4 shows one example embodiment of a method and apparatus for detecting an electromagnetic telemetry signal.
Figure 5:
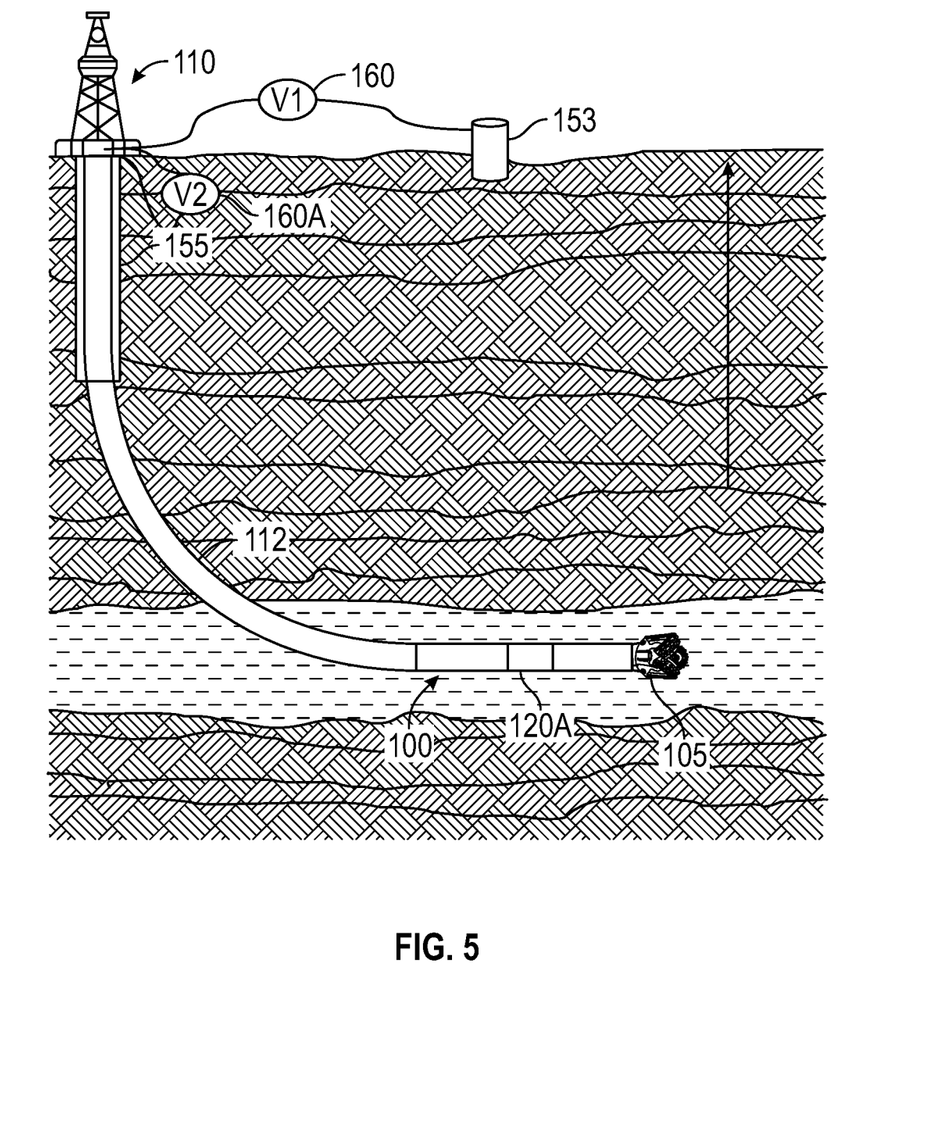
FIG. 5 shows another example embodiment of a method and apparatus for detecting an electromagnetic telemetry signal.

FIG. 4 shows one example of an electromagnetic telemetry system which uses an embodiment of centralizers or standoffs (154 in FIG. 3) that electrically connect the drill string 112 to the casing 155. The BHA 100 may include LWD and/or MWD modules as explained with reference to FIG. 3, and an EM signal transmitter 120A also as explained with reference to FIG. 3. In the embodiment of FIG. 5, an electromagnetic field detector may be implemented as a voltage measuring circuit (e.g., as measured using a voltage measuring circuit 160) may be arranged to measure voltage between the casing 155 and the surface electrode 153 or between the drill string 112 and the surface electrode 153. As a practical matter, the electrical connection between the casing 155 and drill string 112 may not be perfect due to the resistive mud (126 in FIG. 3), which may cause a voltage drop to be induced between the drill string 112 and the casing 155. Electrical contact to the drill string 112 for voltage measurement may be performed by a number of different devices, for example, a metallic brush or a roller which uses a spring force or magnetic force to cause an electrical contact to be connected to the drill string 112 and keeps it electrically connected to the drill string 112. Another possible embodiment may be a metallic pad or roller wheel pushed against the drill string 112 by any form of biasing element. In another example embodiment a wire (not shown) may be connected to the kelly (117 in FIG. 3) or top drive when a top drive is used with the drilling system, and the voltage between the kelly (or top drive) and the casing 155 or between the kelly (117 in FIG. 3) or top drive and the surface electrode 153 may be measured, e.g., by the voltage measuring circuit 160. The wire (not shown) may be reset whenever a drill string segment (i.e., a joint or stand) needs to be inserted or removed from the drill string 112. In addition to increased detectable EM telemetry signal amplitude, another possible advantage of a system according to the embodiment shown in FIG. 4 is that the measured signal when the EM signal transmitter 120A is in in the casing 155 will be substantially unattenuated.

FIG. 5 shows one example of an electromagnetic telemetry system which uses an embodiment of centralizers or standoffs (154 in FIG. 3) that electrically isolate the drill string 112 from the casing 155. The BHA 100 may include LWD and/or MWD modules as explained with reference to FIG. 3, and an electromagnetic signal transmitter 120A also as explained with reference to FIG. 3. In the embodiment of FIG. 5, the electromagnetic (EM) telemetry signal resulting from the EM field induced by the EM signal transmitter 120A may be measured by an electromagnetic field detector implemented, e.g., by a voltage measuring circuit 160 connected between the drill string 112 and the surface electrode 153. In other embodiments, a highly sensitive Hall Effect sensor or current clamp (e.g., as shown at 131 in FIG. 3) may be used to measure electrical current induced in the drill string 112 as an implementation of the electromagnetic field detector. As previously explained, the amplitude and/or phase of the voltage or current measured may correspond to the electromagnetic field induced by the EM signal transmitter 120A. The measured voltage or current may be decoded to recover the sensor measurements encoded therein by the MWD and/or LWD modules (130 and 120, respectively in FIG. 3).

Having shown example systems for detecting EM telemetry signals, an example comparison between EM detection systems known in the art and those according to the present disclosure will now be explained with reference to FIGS. 6-8.

Figure 6:
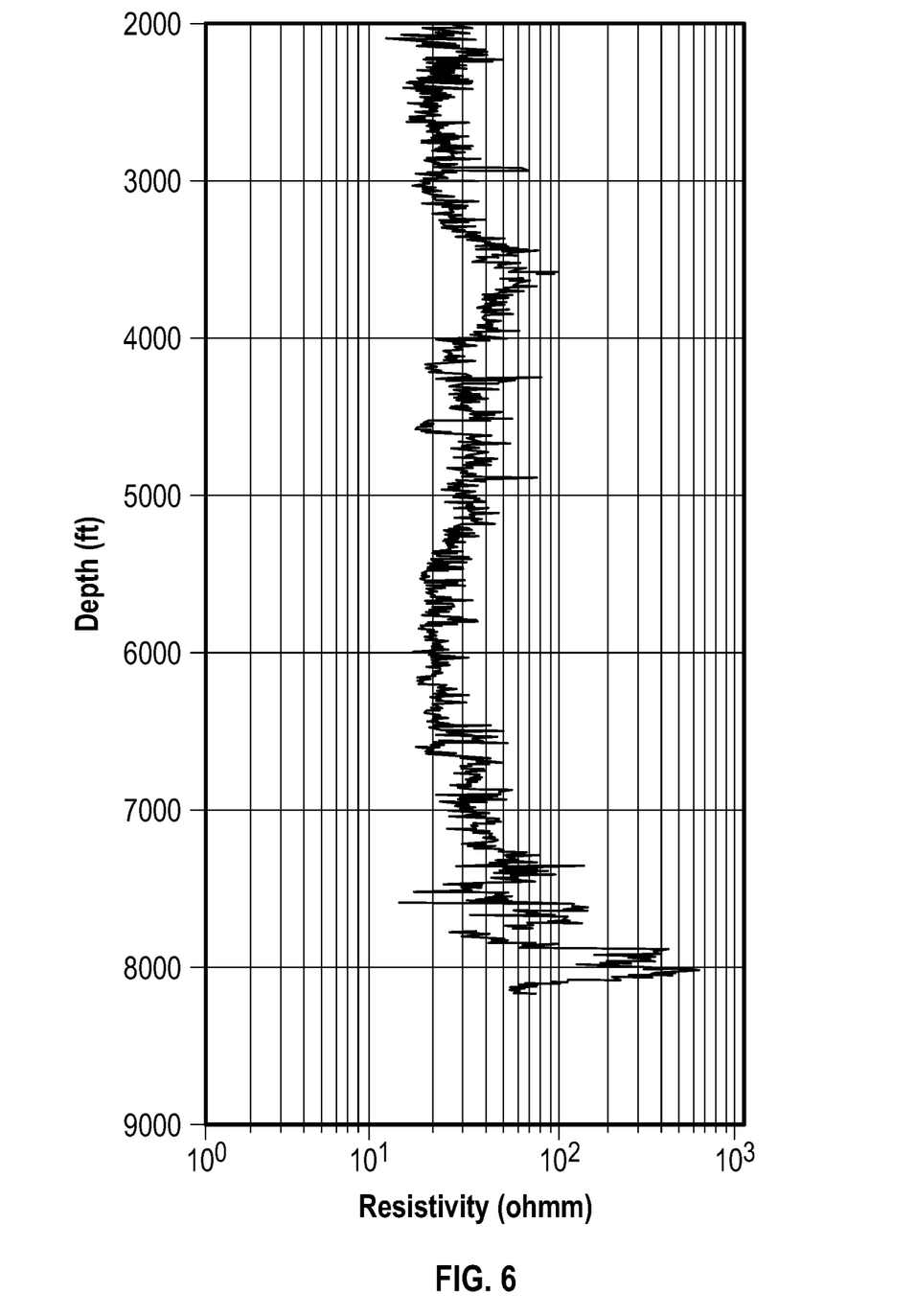
FIG. 6 shows a well log of resistivity of subsurface formations modeling response of the example embodiments of FIGS. 4 and 5.

FIG. 6 shows a resistivity log for an example shale-gas field. The average resistivity value for the formations from the surface to a reservoir formation below the surface is about 25 ohm-m. The casing bottom ("shoe") depth is 2,020 feet. The mud resistivity assumed is 40,000 ohm-m. The wellbore casing outer diameter is 9.625 in and the wellbore diameter is 8.75 inches. Modeling was performed for the EM telemetry systems shown in FIG. 4 and FIG. 5. For both systems, the contact resistivity between the casing (155 in FIG. 4) and the drill string (112 in FIG. 4) is set to 1 ohm-m, if they are connected. The current frequency in the EM signal transmitter (120A in FIG. 4) is 8 Hz, and the surface electrode (153 in FIG. 4) is placed 260 feet away from the surface position of the casing (155 in FIG. 4).

Figure 7:
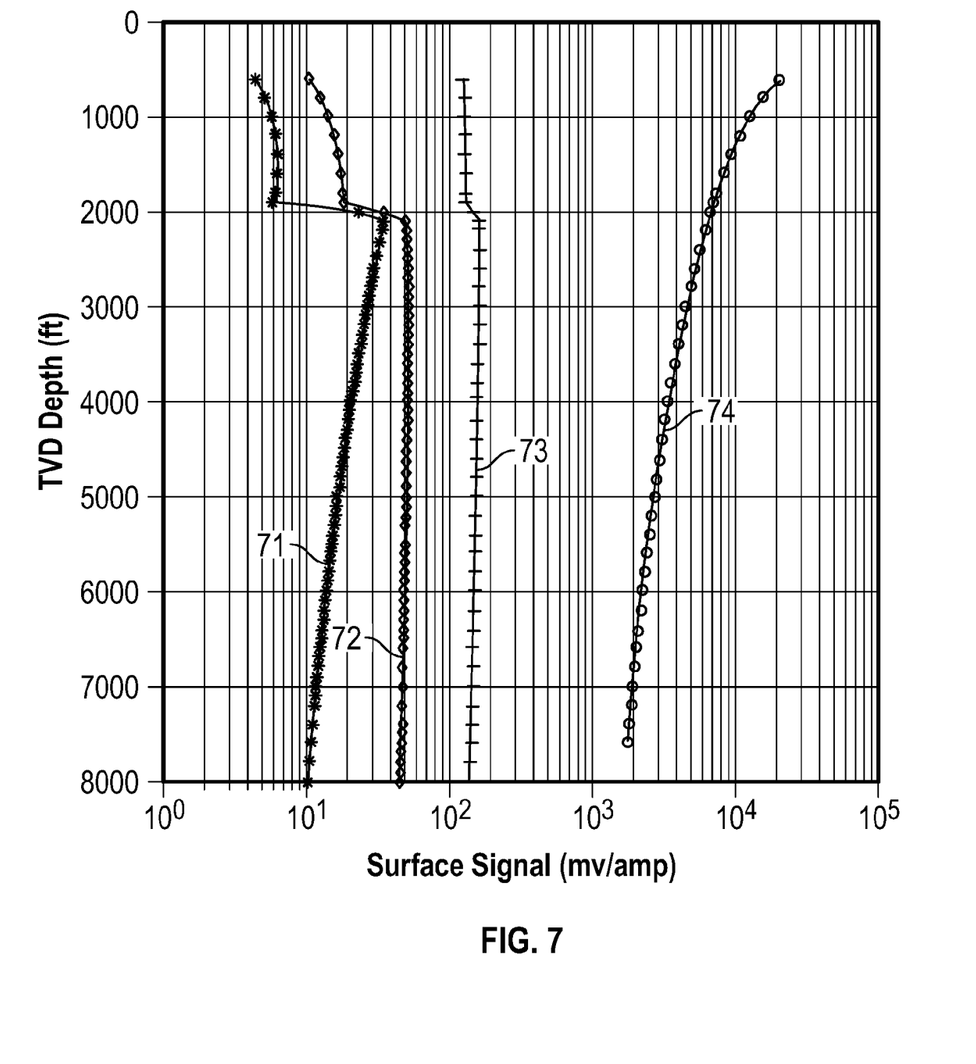
FIG. 7 shows a graph of the detected telemetry signal strength per unit of EM signal transmitter current for EM telemetry known in the art as compared to that for various embodiments according to the present disclosure.

FIG. 7 shows the surface signal strength per unit of EM signal transmitter current. The horizontal axis is the detected signal strength in millivolts/amp, and the vertical axis is the EM signal transmitter vertical depth in feet. Curve 71 represents the detected signal amplitude using the system shown in FIG. 1. Curve 72 represents the detected signal amplitude from the system shown in FIG. 4, with an electrical connection having 1 ohm-m resistivity between the casing and the drill string. Curve 73 represents the detected signal amplitude from the system shown in FIG. 5, with electrical connection (1 ohm-m resistivity) between the casing and the drill string. Curve 74 represents the signal amplitude using the system in FIG. 5 but the casing and the drill string are electrically isolated from each other. When the casing and the drill string are perfectly connected, curve 72 and curve 73 will overlap. Both the system of FIG. 4 and the system of FIG. 5 substantially increase the detected EM telemetry signal at the surface. The increase in detected signal amplitude between curve 71 and curve 74 is at least two orders of magnitude, and curve 72 shows almost no attenuation along the entire range of vertical wellbore depth. In addition, from curve 74, it may be observed that the signal measured when the EM signal transmitter is disposed in the wellbore casing will not be attenuated at all.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:

1. A method for signal communication between a well drilling instrument and the Earth's surface, comprising:
    generating an electromagnetic field in an instrument disposed in a drill string used to drill a wellbore, the electromagnetic field comprising encoded measurements from at least one sensor associated with the instrument;
    measuring a signal corresponding to an amplitude and/or phase of the electromagnetic field; and
    decoding the measurements from the measured signal, wherein the measured signal comprises at least one of;
        a voltage imparted across the drill string and an electrode disposed at a selected distance from the wellbore proximate the Earth's surface wherein the drill string and a wellbore casing are substantially electrically isolated from each other,
        a current induced in the drill string wherein the drill string and the wellbore casing are substantially electrically isolated from each other, and
        a voltage imparted across the well casing and the electrode wherein the casing and the drill string are electrically connected to each other.

2. The method of claim 1 wherein a resistivity of a drilling fluid in the wellbore is in a range between 1,000 ohm meters and 1,000,000 ohm meters.

3. The method of claim 1 wherein the generating an electromagnetic field comprises imparting a time varying voltage across in insulating gap between electrically conductive components of the instrument.

4. The method of claim 1 wherein the generating an electromagnetic field comprises imparting a time varying electric current through a toroidal coil forming part of the instrument.

5. The method of claim 1 further comprising measuring a voltage between the casing and the drill string and decoding the measurements from the voltage measured between the casing and the drill string wherein the drill string and the casing are substantially electrically isolated from each other.

6. The method of claim 1 wherein electrical isolation between the casing and the drill string is performed by at least one insulating standoff or centralizer coupled to the drill string.

7. The method of claim 1 wherein electrical connection between the casing and the drill string is performed by at least one electrically conductive standoff or centralizer coupled to the drill string.

8. A system for communication between a wellbore instrument and the Earth's surface, comprising:
    an electromagnetic field generator associated with the wellbore instrument in a drill string in a wellbore, the electromagnetic field generator configured to encode measurements made by at least one sensor associated with the wellbore instrument; and
    an electromagnetic field detector in signal communication with the Earth's surface, the electromagnetic field detector comprising at least one of;
        a voltage measuring circuit connected between the drill string and an electrode disposed at a selected distance from the wellbore proximate the Earth's surface wherein the drill string and a wellbore casing are substantially electrically isolated from each other,
        a current measuring circuit for measuring current induced in the drill string wherein the drill string and the wellbore casing are substantially electrically isolated from each other, and
        a voltage measuring circuit connected between the well casing and the electrode wherein the casing and the drill string are electrically connected to each other.

9. The system of claim 8 wherein the electromagnetic field generator associated with the wellbore instrument comprises an insulating gap disposed between electrically conductive parts of the wellbore instrument.

10. The system of claim 8 wherein the electromagnetic field generator associated with the wellbore instrument comprises a toroidal coil disposed on the wellbore instrument.

11. The system of claim 8 further comprising at least one standoff or centralizer comprising an electrically insulating material coupled to the drill string.

12. The system of claim 8 further comprising at least one standoff of centralizer comprising an electrically conductive material coupled to the drill string.

13. A method for measurement in a wellbore, comprising:
moving a wellbore instrument coupled to a drill string along an interior of a wellbore, the wellbore instrument including at least one sensor;
generating an electromagnetic field in the wellbore instrument, the electromagnetic field comprising encoded measurements from the at least one sensor;
measuring a signal corresponding to an amplitude and/or phase of the electromagnetic field; and
decoding the encoded measurements from the measured signal, wherein the measured signal comprises at least one of;
- a voltage imparted across the drill string and an electrode disposed at a selected distance from the wellbore proximate the Earth's surface wherein the drill string and a wellbore casing are substantially electrically isolated from each other,
- a current induced in the drill string wherein the drill string and the wellbore casing are substantially electrically isolated from each other, and
- a voltage imparted across the well casing and the electrode wherein the casing and the drill string are electrically connected to each other.

14. The method of claim 13 wherein a resistivity of a drilling fluid in the wellbore is in a range between 10,000 ohm meters and 100,000 ohm meters.

15. The method of claim 13 wherein the generating the electromagnetic field comprises imparting a time varying voltage across in insulating gap between electrically conductive components of the instrument.

16. The method of claim 13 wherein the generating the electromagnetic field comprises imparting a time varying electric current through a toroidal coil forming part of the instrument.

17. The method of claim 13 further comprising measuring a voltage between the casing and the drill string and decoding the measurements from the voltage measured between the casing and the drill string wherein the drill string and the casing are substantially electrically isolated from each other.

18. The method of claim 13 wherein electrical isolation between the casing and the drill string is performed by at least one insulating standoff or centralizer coupled to the drill string.

19. The method of claim 13 wherein electrical connection between the casing and the drill string is performed by at least one electrically conductive standoff or centralizer coupled to the drill string.

* * * * *